United States Patent

Kahn et al.

[15] 3,696,298

[45] Oct. 3, 1972

[54] AUDIO SIGNAL TRANSMISSION SYSTEM AND METHOD

[72] Inventors: Leonard R. Kahn, Freeport; Robert R. Gordon, Westbury, both of N.Y.

[73] Assignee: Kahn Research Laboratories, Inc., Freeport, N.Y.

[22] Filed: July 27, 1970

[21] Appl. No.: 58,227

Related U.S. Application Data

[63] Continuation-in-part of Ser. No. 652,529, July 11, 1967, abandoned.

[52] U.S. Cl. ....................325/59, 179/15.55, 325/65

[51] Int. Cl. ..............................................H04b 1/66

[58] Field of Search..........325/32, 33, 59, 60, 61, 56, 325/65; 393/200; 179/15.55 R, 15 FD; 332/48, 31, 40

[56] References Cited

UNITED STATES PATENTS

| | | | |
|---|---|---|---|
| 1,749,045 | 3/1930 | Nuquist et al. | ..............325/59 |
| 1,812,405 | 6/1931 | Ives | ........................179/15.55 |
| 2,576,115 | 11/1951 | Hill | ..............................325/59 |
| 1,948,973 | 2/1934 | Steinberg | ................179/15.55 |
| 3,364,311 | 1/1968 | Webb (Parker) | ........325/63 X |

*Primary Examiner*—Benedict V. Safourek
*Attorney*—Albert F. Kronman

[57] ABSTRACT

A system and method for processing relatively high fidelity audio signals (having components in the high, intermediate and low frequency ranges, such as speech and music signals having frequencies between about 50 c.p.s. and 6,000 c.p.s., for example) for transmission across relatively low fidelity transmission channels e.g., telephone lines or radio frequency carrier waves which are restricted to low fidelity signal modulation) adapted to effectively transmit only electrical signal components in an intermediate frequency range e.g., from about 300 c.p.s. to about 4,000 c.p.s., for example). Typical practice of the invention involves isolation of the signal components in the intermediate frequency range for transmission on one one such low fidelity channel, and isolation of the signal components in high and low frequency to derive non-overlapping, frequency-displaced signals in the intermediate frequency range. These frequency-displaced signals are thereafter transmitted on a second such low fidelity transmission channel. At the receiving location, the frequency-displaced signals are converted to their original high and low frequency components and combined with the intermediate frequency components to substantially re-establish the original audio signal.

Where transmission channels having no low frequency limitations (e.g., some radiated carrier waves or line transmitted radio frequency carrier waves) are employed, it is not necessary to isolate and up-shift the frequencies of the signal components in the low frequency range. Such components are transmitted with the signal components in the intermediate frequency range across a single channel; and the signal components in the high frequency range are isolated, down-shifted in frequency into the intermediate frequency range and transmitted across a second channel.

17 Claims, 2 Drawing Figures

INVENTORS
LEONARD R. KAHN
ROBERT R. GORDON
By Albert Kronman
ATTORNEY

INVENTORS
LEONARD R. KAHN
ROBERT R. GORDON

By Albert H. Gorman

ATTORNEY

AUDIO SIGNAL TRANSMISSION SYSTEM AND METHOD

This application is a continuation of application, Ser. No. 652,519, filed by Leonard R. Kahn and Robert L. Gordon, now abandoned.

BACKGROUND OF THE INVENTION

The present invention relates generally to improvements in the field of audio signal transmission. More particularly, this invention provides an improved system and method for transmitting high fidelity audio signals (having components in the high, intermediate and low frequency ranges) across relatively low fidelity transmission channels adapted to effectively transmit only electrical signal components in an intermediate frequency range or in low and intermediate frequency ranges.

High fidelity transmission channels (channels capable of effectively transmitting electrical signals having components in the high intermediate and low frequency ranges) are often unavailable, too expensive or otherwise impractical for use in certain situations where relatively low fidelity channels (e.g., telephone lines or radio frequency carrier waves which are restricted to low fidelity signal modulation) adapted to effectively transmit signal components in an intermediate frequency range (e.g., from about 300 c.p.s. to about 4,000 c.p.s.) are available. However, since such low fidelity channels are not capable of effectively transmitting signals having components in the high and low frequency ranges they have not been utilized in transmitting high fidelity audio signals (such as speech and music signals having frequencies between about 50 c.p.s. and 6,000 c.p.s., for example).

SUMMARY OF THE INVENTION

In view of the foregoing, it is an object of the present invention to provide signal transmission systems effectively employing relatively low fidelity transmission channels to effectively transmit relatively high fidelity electrical signals.

Another object of this invention is to provide audio signal transmission systems adapted to employ conventional telephone lines for transmitting relatively high fidelity audio signals, such as speech and music.

A further object of the present invention is the provision of an audio signal transmission system utilizing two relatively low fidelity transmission channels for transmitting relatively high fidelity electrical signals from a transmitting station to a receiving station and equipped with means for controlling relative gain in the two transmission channels.

Another object of this invention is the provision of an audio signal transmission system of the type described in the preceding paragraph and further equipped with means for correcting frequency translation errors in the transmission channels.

The system of the preferred embodiment of this invention utilizes two relatively low fidelity transmission channels (e.g., telephone lines) adapted to effectively transmit only electrical signal components in an intermediate frequency range (e.g., from about 300 c.p.s. to about 4,000 c.p.s.) for transmitting high fidelity audio signals (e.g., speech and music signals having frequencies between about 50 c.p.s. and 6,000 c.p.s.) from a transmitting station to a receiving station. The system isolates the signal components in the intermediate frequency range and transmits them across one such low fidelity channel. The system also isolates the signal components in the high and low frequency ranges, shifts their frequencies to derive non-overlapping, frequency-displaced signal components in the intermediate frequency range, and thereafter transmits such frequency-displaced signals across a second such low fidelity transmission channel. At the receiving station, the frequency-displaced signals are converted to their original high and low frequency components and combined with the intermediate frequency components to substantially reproduce the original audio signal. The system further includes means for adjusting the signals transmitted across the two low fidelity transmission channels at the receiving station to compensate for relative channel gain.

Transmission channels having no low frequency limitations (such as in some electromagnetically radiated carrier waves or in some line transmitted radio frequency carrier waves, for example) may also be employed. In this case it is not necessary to isolate and upshift the frequencies of the signal components in the low frequency range. Such components are transmitted with the signal components in the intermediate frequency range over a single channel; and the signal components in the high frequency range are isolated, down-shifted in frequency into the intermediate frequency range, and transmitted over a second channel. An automatic frequency control system may be employed to correct any frequency translation errors which may occur in the transmission channels.

BRIEF DESCRIPTION OF THE DRAWINGS

The foregoing and other objects, features and characteristics of the present invention will be apparent from the following specific description and the accompanying drawing relating to typical embodiments thereof, wherein like numerals refer to like parts, and wherein.

DESCRIPTION OF THE PREFERRED EMBODIMENTS

Figure 1:
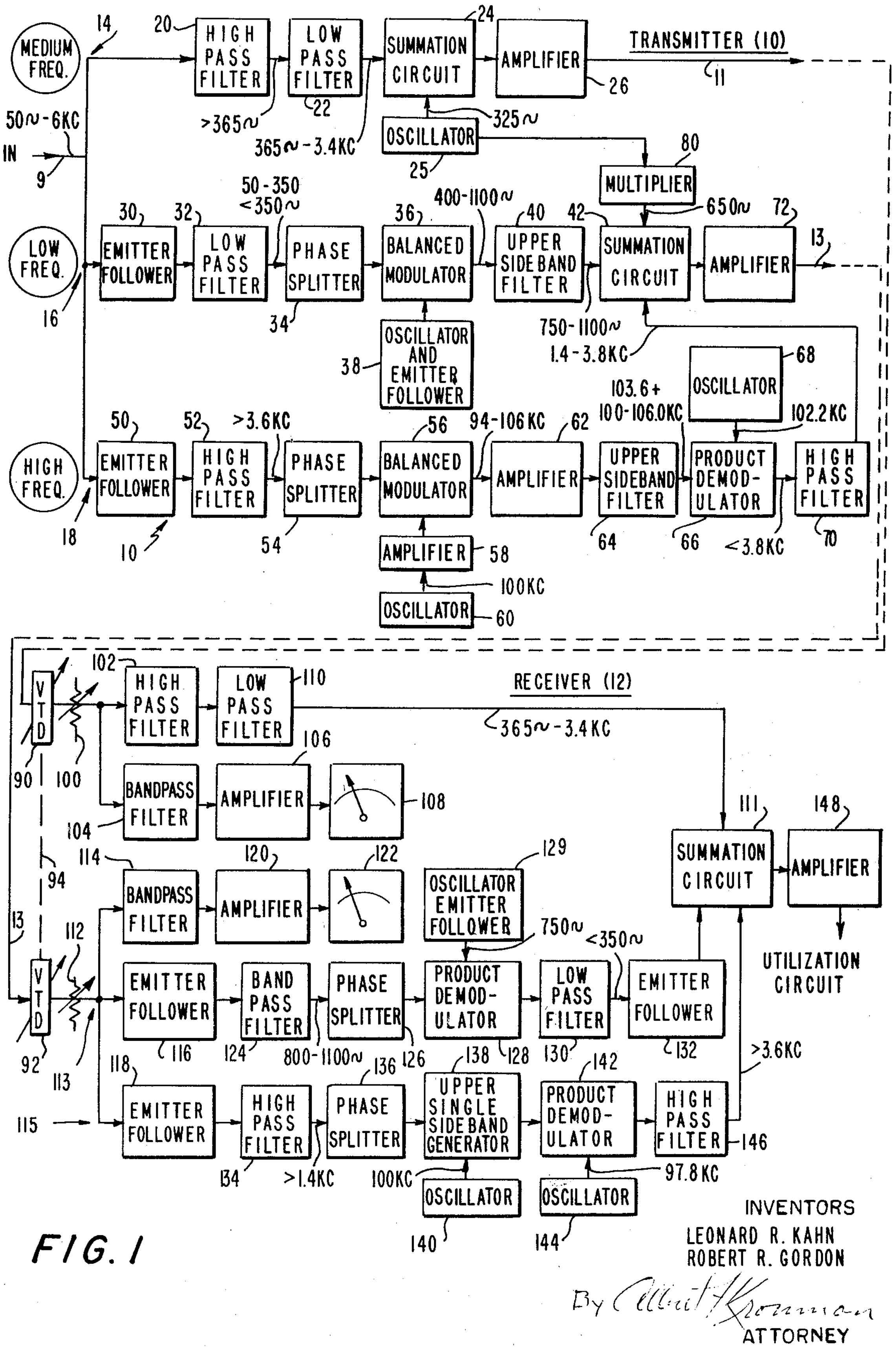
FIG. 1 is a block diagram of a typical system constructed in accordance with the teachings of the present invention.

The signal transmission system illustrated in FIG. 1 comprises a transmitter station generally indicated at 10 and a receiver station generally indicated at 12, interconnected by a pair of low fidelity transmission channels 11 and 13. While these channels will be referred to as conventional telephone lines in the following description of FIG. 1, it is to be understood that they may be radio frequency carrier waves which are restricted to low fidelity signal modulation or any other suitable low fidelity type of transmission channels.

The input end of the transmitter 10 includes three separate branches 14, 16 and 18 which split the audio input signal 9 into three frequency related segments. The input signal 9 may include voice and music signals which typically include components having frequencies between about 50 c.p.s. and about 6,000 c.p.s.

The branch 14 includes a high pass filter 20 and a low pass filter 22 in series which function to isolate the signal components in the intermediate frequency range. Assuming the transmission lines 11 and 13 are adapted to effectively transmit electrical signal components having frequencies between about 300 c.p.s. and about 4,000 c.p.s., the high pass filter 20 may be designed to pass signals having frequencies above about 365 c.p.s. and the low pass filter 22 may be designed to pass signals having frequencies below about 3,400 c.p.s., for example. A summation circuit 24 in series with the high and low pass filters 20 and 22 receive the signal components in the intermediate frequency range and also receives a gain setting reference tone from an oscillator 25. The oscillator tone may typically have a frequency of about 325 c.p.s., for example. The output from the summation circuit 24 feeds an amplifier 26 and a test meter switch (not shown). The output from the amplifier 26 is transmitted to the receiving station across the telephone lines 11.

A second segment of the audio input signal is fed to an emitter follower 30 in the branch 16 of the transmitter 10. The output from the emitter follower 30 is fed to a low pass filter 32 which functions to isolate the input signal component in the low frequency range (below about 350 c.p.s., for example).

The output from the low pass filter 32 is fed to a phase splitter 34 which in turn feeds a balanced modulator 36. The modulator 36 also receives a carrier wave input (at 750 c.p.s., for example) from oscillator 38 and produces a double-sideband, suppressed carrier wave. An upper sideband filter 40 receives the output from the modulator 36, and passes the upper sideband and attenuates the lower sideband. The output signal from the upper sideband filter 40 has a frequency range between about 750 c.p.s. and 1,100 c.p.s., for example. This signal is then fed to a summation circuit 42 which also receives the output signal from the branch 18 of the transmitter circuit. Balanced modulators and phase splitters are well known in the art. U.S. Pat. No. 1,343,306, issued to John Carson, June 15, 1920, discloses several types of balanced modulators, all with phase splitter inputs.

The third branch 18 of the transmitter circuit 10 receives a third segment of the input signal 9. A high pass filter 52 receives the signal from an emitter follower 50 and isolates the signal components in the high frequency range. The filter 52 is typically designed to pass components having frequencies greater than 3,600 c.p.s., for example. A phase splitter 54 receives the output signal from the high pass filter 52 and drives a balanced modulator 56.

The modulator 56 also receives a carrier wave generated by a crystal oscillator 60 and passes through an amplifier 58. The carrier wave typically has a frequency of about 100,000 c.p.s., for example. The output from the modulator 56 is a double-sideband suppressed carrier wave which is fed to an amplifier 62 and then to an upper sideband filter 64. The output signal from the upper sideband filter 64 will have a frequency range between about 100,000 c.p.s. and 106,000 c.p.s., in the example selected. Product demodulator 66 driven by an oscillator 68 receives the output signal from the filter 64 and feeds a high pass filter 70. The oscillator 68 is typically designed to generate a 102,200 cycle signal, for example, in which case the maximum frequency of the output signal from the demodulator 66 is about 3,800 c.p.s. The high pass filter 70 typically is designed to pass only signals having frequencies greater than 1,400 c.p.s., in which case the output signal fed to the summation circuit 42 from the branch 18 has a frequency range between about 1,400 c.p.s. and about 3,800 c.p.s. Thus, the two frequency-displaced signals fed to the summation circuit 42 from the branches 16 and 18 have frequency ranges which do not overlap.

The resultant signal from the summation circuit 42 is fed to amplifier 72 and then to the receiving station 12 via the telephone lines 13.

The oscillator 25 which feeds a 325 c.p.s. gain setting reference tone to the summation circuit 24 in the branch 14 also feeds a multiplier circuit 80 which generates a signal having twice the frequency (i.e., 650 c.p.s.) and delivers it to the summation circuit 42.

In many operational situations a difference in time delay can occur between the two transmission channels for the respective transmitted signals, e.g., transmit time differences between lines 11 and lines 13. To compensate for any such transmission time differences, two variable time delays 90, 92 can be employed at the receiving ends of the respective lines 11, 13. These variable time delays can be of any form known per se for the purpose, e.g., passive networks, or magnetic tape loops or drums. If desired, automatic compensation of the relative delay can be effected in a known manner, as diagrammatically indicated at 94.

At the receiving station 12 the signal transmitted along telephone lines 11 is fed through a variable attenuator 100 to a high pass filter 102 and a bandpass filter 104. The bandpass filter 104 is designed to pass substantially only the gain setting reference tone, i.e., a signal having a frequency of about 325 cycles. Thus, only the gain setting reference tone is fed through the amplifier 106 to the voltmeter 108. The reading from the voltmeter 108, together with the reading from a similar voltmeter 122 employed in connection with the lines 13, is employed to adjust the variable attenuator 100 to equalize the gains in lines 11 and 13.

The high pass filter 102 is typically designed to pass signals having frequencies above about 365 c.p.s., and the output signal therefrom feeds a low pass filter 110 which is typically designed to pass signals having frequencies below about 3,400 c.p.s., for example. The output signal from the low pass filter 110 is fed to a summation circuit 111 which also receives the signals from branches 113 and 115, described below.

The signal from lines 13 is fed to a variable attenuator 112 which, in turn, feeds a bandpass filter 114 and emitter followers 116 and 118. The bandpass filter 114 is designed, for example, to pass only a signal having a frequency of about 650 c.p.s., i.e., only the 650 c.p.s. gain setting reference tone. This tone is then fed through an amplifier 120 to the voltmeter 122. As indicated above, the reading on the meter 122 is employed in conjunction with the reading from the meter 108 to set the variable attenuators 100 and 112 to equalize the gains in the lines 11 and 13.

The emitter follower 116 in the receiver branch channel 113 feeds a bandpass filter 124 which may be designed, for example, to pass signals having frequencies between about 800 c.p.s. and about 1,100 c.p.s. The output signal from the bandpass filter is fed to a phase splitter 126 which drives a product demodulator 128 which also receives a 750 c.p.s. carrier wave input from oscillator and emitter follower 129. The output signal from the product demodulator 128 feeds a low pass filter 130 which is typically designed to pass only signals having frequencies below about 350 c.p.s., for example.

Thus, the output signal from the low pass filter 130 constitutes the low frequency signal components fed through channel 16 of the transmitter circuit 10. This low frequency output signal is fed through an emitter follower 132 to the summation circuit 111 where it is combined with the intermediate frequency components from the lines 11 and the high frequency components from the branch channel 115, which are developed as discussed below.

The signal passed through the emitter follower 118 is fed to a high pass filter 134 which is typically designed to pass only signals having frequencies above about 1,400 c.p.s., for example. The output signal from the high pass filter 134 is fed to a phase splitter 136 which in turn feeds an upper single sideband generator 138. The generator 138 also receives a carrier wave, typically at a frequency of 100,000 c.p.s. for example, from oscillator 140. The output signal from the upper single sideband generator 138 feeds a product demodulator 142 which also receives a carrier wave from an oscillator 144. The frequency of the carrier wave fed to the product demodulator 142 is typically 97,000 c.p.s., for example.

The output signal from product demodulator 142 is passed through a high pass filter 146 which may be designed to pass only signals having frequencies above about 3,600 c.p.s., for example. The output signal of the high pass filter 146 constitutes the high frequency components of the original input signal fed through the branch channel 18 in the transmitter circuit 10, and is fed to the summation circuit 111 wherein it is combined with the low frequency components from the branch channel 113 and the intermediate frequency components from the lines 11. The output signal from summation circuit 111 thus constitutes the original input signal which may then be fed to an amplifier 148 and to suitable utilization means (not shown).

As can be seen from the foregoing, the system disclosed in FIG. 1 is adapted to transmit a single high fidelity audio signal across two low fidelity transmission lines.

As earlier indicated, the system of the present invention is also adapted to transmit high fidelity signals across low fidelity transmission channels other than telephone lines. For example, radio frequency carrier waves which are restricted to low fidelity signal modulation may be employed as the transmission channels.

When modulated radio frequency carriers are employed, it may be desirable to incorporate an automatic frequency control system in the circuitry to correct any frequency translation errors which occur during transmission.

Figure 2:
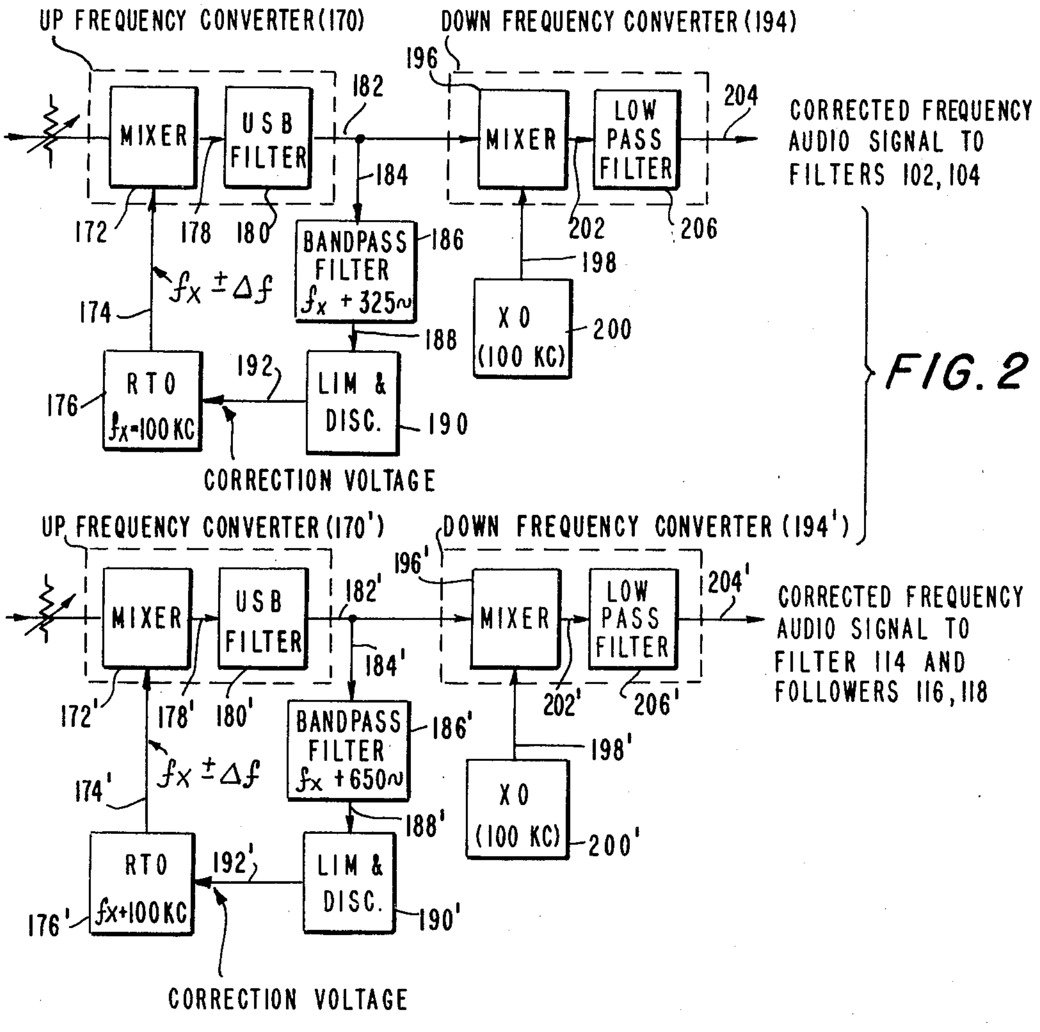
FIG. 2 is a block diagram of a typical automatic frequency control system which may be incorporated in the system of FIG. 1 to correct frequency translation errors in the transmission channels.

FIG. 2 illustrates a typical automatic frequency control system for each signal channel. Basically, each such system develops a frequency correction from the gain setting reference tone portion of the received signal and incorporates frequency conversion means responsive to such correction signal and operating to convert the frequency components of the received signal to substantially reproduce the reference tone and other frequency components of the transmitted signal. As shown in FIG. 2, the signal received on lines 11, which may be subject to frequency translation errors during transmission (e.g., carrier frequency drift), is passed to an up frequency converter generally designated 170, wherein the received signal 50 reference is mixed in mixer 172 with an intermediate frequency $f_x$ input 174 from a reactance oscillator 176 operating nominally at an intermediate frequency $f_x$ of 100 KCS, for example. The output 178 from mixer 172 is fed to an upper sideband filter 180 and, as will be apparent, the output 182 from this filter comprises the received signal translated to stepped up to frequency the amount of the intermediate frequency $f_x$. A sample 184 of this output is fed to bandpass filter 186 which is designed to select only that portion of the translated signal which includes the gain setting reference tone of this channel (nominally 325 c.p.s.), i.e., bandpass filter 186 is designed to pass a narrow band of frequencies such as $f_x + 325 \pm 50$ cycles, for example. The translated gain setting reference tone output 188 thus selected is fed to a limiter and discriminator circuit 190 tuned to the translated gain setting reference tone ($f_x$+ 325 cycles) and develops a DC correction voltage output 192, the voltage of which is a function of frequency variations of the translated gain setting reference tone from the desired frequency thereof ($f_x$ + 325 c.p.s.). This correction voltage output 192 is applied to reactance oscillator 176 to appropriately vary the intermediate frequency ($f_x \pm \Delta f$) applied to mixer 172 and develop in the up frequency converter output 182 an upper sideband signal spectrum accurately reflecting the input aural signal of the channel. The output 182, thus translated and corrected in frequency, is passed to a down frequency converter, generally indicated at 194, comprising a mixer 196 which receives an input 198 from a stable crystal oscillator 200 operating at the appropriate frequency (e.g., 100 KCS) to produce the desired aural signal in the output 202 from mixer 196. The aural components of output 202 appear as output 204 from lowpass filter 206 and this corrected frequency audio signal is then applied to the high pass filter 102 and bandpass filter 104 in the circuit shown in FIG. 1.

The frequency translation and frequency correction circuitry associated with the lines 13 receiver circuit and shown in the lower half of FIG. 2 are like the counterpart circuit elements associated with lines 11 (and have been designated with like prime numerals) except that the bandpass filter 186' is tuned to and selects the gain setting reference tone of this channel by being tuned to a center frequency of $f_x + 650$ c.p.s., and with the limiter and discriminator 190' being correspondingly tuned to this frequency.

From the foregoing, further variations and applications of the invention will be apparent to those skilled in the art to which the invention is addressed, within the scope of the following claims.

We claim:

1. A system for processing relatively high fidelity audio signals having components in high, intermediate and low frequency ranges for transmission over two relatively low fidelity transmission lines comprising:

a. a high pass filter fed by the input wave connected to a pair of input terminals for passing signals in the high frequency range to a first transmission channel;
b. a first modulating means applied to the first channel for frequency-displacing the signals in the high frequency range to produce signals in a first portion of the intermediate frequency range;
c. a low pass filter also fed by the input wave connected to the input terminals for passing signals in the low frequency range to the first transmission channel;
d. a second modulating means applied to the first channel for frequency-displacing the signals in the low frequency range to produce signals in a second portion of the intermediate frequency range;
e. coupling means for connecting the outputs of the first and second modulating means to one end of a first transmission line;
f. a band pass filter also fed by the input wave connected to the input terminals for passing signals in the intermediate frequency range to one end of a second transmission line;
g. a receiving means at the other end of the first transmission line and including a first demodulating circuit for converting the frequency-displaced signals in the first portion of the intermediate frequency range to their original high frequency components; said receiving means also including a second demodulating circuit for converting the frequency-displaced signals in the second portion of the intermediate frequency range to their original low frequency components;
h. and a summation circuit connected to the output ends of the first and second transmission lines for adding the components to produce the original high fidelity signal.

2. A system according to claim 1 wherein the band pass filter comprises a high pass filter and a low pass filter, both arranged to pass only the signals above the low frequency range and below the high frequency range.

3. A system according to claim 1 wherein said second modulating means includes a phase splitter for receiving the output signal from the low pass filter means, an oscillator for generating a carrier wave, a balanced modulator for receiving the output signal from the phase splitter and the carrier wave from the oscillator, and an upper side band filter for receiving the output signal from the balanced modulator.

4. A system according to claim 1 wherein the second modulating means includes a phase splitter for receiving the output signal from the high pass filter, a first oscillator for generating a carrier wave, a balanced modulator for receiving the output signal from the phase splitter and the carrier wave from the first oscillator, an upper sideband filter for receiving the output from the balanced modulator, a second oscillator for generating a carrier wave, a product demodulator for receiving the output signal from the upper sideband filter and the carrier wave from the second oscillator and a high pass filter for receiving the output signal from the product demodulator.

5. A system according to claim 1 wherein the first and second demodulator circuits each include:

a band pass filter receiving the first and second frequency-displaced signals from their low fidelity transmission channel and passing substantially only the first frequency-displaced signal;
a phase splitter circuit for receiving the output signal from the band pass filter;
a product demodulator for receiving the output signals from the phase splitter circuit; and
a low pass filter for receiving the output signal from the product demodulator and applying the resultant signals to the summation circuit.

6. A system according to claim 5 wherein the first and second demodulator circuits also include:

a first oscillator for generating a first carrier wave;
a second oscillator for generating a second carrier wave;
a product demodulator for receiving the first and second carrier waves from the oscillators;
and a high pass filter for receiving the output signals from the product demodulator and applying the resultant signals to the summation circuit.

7. A system according to claim 1 wherein a variable time delay means is connected in series with the first transmission line at the other end of the line for correcting transit time differences between the first and second transmission lines.

8. A system according to claim 1 wherein a variable time delay means is connected in series with the second transmission line at the other end of the line for correcting transit time differences between the first and second transmission lines.

9. A system for processing relatively high fidelity audio signals having components in high and intermediate frequency ranges for transmission over relatively low fidelity transmission channels comprising:

a. a high pass filter connected in series with a first channel for passing substantially only signals in the high frequency range;
b. modulating means applied to the first channel for frequency-displacing the signals in the high frequency range to produce signals in the intermediate frequency range;
c. connecting means for applying the frequency-displaced signals to a first low fidelity transmission line, and a connecting means for applying the signals in the intermediate frequency range to a second low fidelity transmission line;
d. a first receiving circuit connected to the first transmission line and including a demodulating circuit for converting the frequency-displaced signal to its original high frequency components;
e. a second receiving circuit connected to the second transmission line for receiving the intermediate frequency components;
f. a summation circuit connected to the first and second receiving circuits for adding the signals to produce the original high fidelity signal;
g. generating means for producing a gain setting reference tone for transmission over both first and second channels, a band pass filter in the receiver system for receiving and passing only the reference tone from each of the low fidelity channels, and indicating means responsive to the reference tone amplitudes for adjusting the gains in each of the channels to substantial equality, and h. means for modulating the audio signals by a radio frequency carrier wave during transmission of the audio signals, and an automatic frequency control circuit for each audio signal channel, such automatic frequency control circuit including means developing from the reference tone portion of the received signal a frequency correction signal, and frequency conversion means responsive to such correction signal and converting the frequency components of the received signal to substantially reproduce the reference tone and other frequency components of the signal as transmitted in the signal channel.

10. A system as claimed in claim 9 wherein the audio signals to be transmitted also have components in a low frequency range, low pass filter means for isolating the components in the low frequency range, modulating means for such components to derive a second frequency-displaced signal occupying only a portion of the intermediate frequency range, and connecting means for applying the second frequency-displaced signal to the first transmission line.

11. A system as claimed in claim 10 wherein the means for isolating the signal components in the intermediate frequency range comprise a high pass filter and a low pass filter, both arranged to pass only the signals above the low frequency range and below the high frequency range.

12. A system as claimed in claim 10 wherein said means isolating the signal components in the low frequency range comprises low pass filter means receiving the high fidelity audio signals and passing substantially only the signal components thereof in the low frequency range; and wherein said means modulating such low frequency components comprise:

a phase splitter for receiving the output signal from the low pass filter means;

an oscillator for generating a carrier wave;

a balanced modulator for receiving the output signal from the phase splitter and the carrier wave from the oscillator; and an upper side band filter for receiving the output signal from the balanced modulator.

13. A system as claimed in claim 10 wherein the means isolating the signal components in the high frequency range comprises a high pass filter for receiving the high fidelity audio signals and for passing substantially only the signal components in the high frequency range; and wherein the modulator for the high frequency components comprises:

a phase splitter circuit for receiving the output signal from the high pass filter;

a first oscillator for generating a carrier wave;

a balanced modulator for receiving the output signal from the phase splitter and the carrier wave from the first oscillator;

an upper sideband filter for receiving the output from the balanced modulator;

a second oscillator for generating a carrier wave;

a product demodulator for receiving the output signal from the upper sideband filter and the carrier wave from the second oscillator; and a high pass filter for receiving the output signal from the product demodulator.

14. A system as claimed in claim 10 wherein the receiver system also includes:

a first receiving circuit for receiving the signal components in the intermediate frequency range from their low fidelity transmission channel;

a second receiving circuit for receiving the first and second frequency-displaced signals in the intermediate frequency range from their low fidelity transmission channel;

a demodulator for receiving the first and second frequency-displaced signals and for converting them to their original components; and a summation circuit for combining signal components in the high and low frequency ranges with the signal component in the intermediate frequency range to substantially reestablish the original high fidelity audio signal.

15. A system as claimed in claim 14 wherein the demodulator circuits which receive the first and second frequency-displaced signals comprise:

a band pass filter receiving the first and second frequency-displaced signals from their low fidelity transmission channel and passing substantially only the first frequency-displaced signal;

a phase splitter circuit for receiving the output signal from the band pass filter;

a product demodulator for receiving the output signals from the phase splitter circuit; and a low pass filter for receiving the output signal from the product demodulator and applying the resultant signals to a summation circuit.

16. A system as claimed in claim 14 wherein the demodulator circuits which receive the first and second frequency-displaced signals comprises:

a high pass filter for receiving the first and second frequency-displaced signals from their low fidelity transmission channel and passing substantially only the second-displaced signal;

a phase splitter means for receiving the output signal from the high pass filter;

a first oscillator for generating a first carrier wave;

an upper single sideband generator circuit for receiving the output signal from the phase splitter circuit and receiving the first carrier wave from the first oscillator;

a second oscillator for generating a second carrier wave;

a product demodulator circuit for receiving the output signals from the upper single sideband generator and the second carrier wave from the second oscillator; and a high pass filter for receiving the output signals from the product demodulator and applying the resultant signals to a summation circuit.

17. A system as claimed in claim 10 wherein the generator which produces the reference tone is connected to both of the low fidelity transmission channels, and wherein the receiver system further includes a bandpass filter for receiving and passing substantially only the gain setting reference tone from each of the low fidelity transmission channels, and variable attenuator means for adjusting the gains in each of the transmission channels to substantially equality.

* * * * *